(12) United States Patent
Pellarin et al.

(10) Patent No.: US 10,371,339 B2
(45) Date of Patent: Aug. 6, 2019

(54) LIGHTING MODULE WITH DIFFRACTION SCREEN FOR A MOTOR VEHICLE

(71) Applicant: VALEO VISION, Bobigny (FR)

(72) Inventors: Marie Pellarin, Bobigny (FR); David Bourdin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/696,879

(22) Filed: Sep. 6, 2017

(65) Prior Publication Data

US 2018/0066822 A1 Mar. 8, 2018

(30) Foreign Application Priority Data

Sep. 6, 2016 (FR) ...................... 16 58254

(51) Int. Cl.

| | |
|---|---|
| *G02B 5/32* | (2006.01) |
| *F21S 41/40* | (2018.01) |
| *F21S 41/25* | (2018.01) |
| *F21S 41/141* | (2018.01) |
| *F21S 41/147* | (2018.01) |
| *F21Y 115/10* | (2016.01) |
| *G03H 1/22* | (2006.01) |

(52) U.S. Cl.
CPC ............. *F21S 41/40* (2018.01); *F21S 41/141* (2018.01); *F21S 41/147* (2018.01); *F21S 41/25* (2018.01); *G02B 5/32* (2013.01); *F21Y 2115/10* (2016.08); *G03H 1/2202* (2013.01)

(58) Field of Classification Search
CPC .................. F21S 41/40; F21S 41/25
See application file for complete search history.

(56) References Cited

U.S. PATENT DOCUMENTS

| | | | |
|---|---|---|---|
| 6,193,400 B1* | 2/2001 | Schuster ............ | B60Q 1/0041 362/538 |
| 2005/0052742 A1 | 3/2005 | Brinkmann et al. | |
| 2006/0039160 A1* | 2/2006 | Cassarly ............ | A47F 11/10 362/551 |
| 2007/0183164 A1 | 8/2007 | Naganawa et al. | |
| 2009/0316415 A1* | 12/2009 | Sato ................ | F21V 7/04 362/296.01 |
| 2010/0226142 A1* | 9/2010 | Brendle ............ | F21S 41/683 362/512 |
| 2013/0021812 A1* | 1/2013 | Schug .............. | F21S 41/143 362/487 |
| 2015/0267889 A1* | 9/2015 | Toko ............... | F21S 48/1752 362/467 |
| 2016/0201867 A1 | 7/2016 | Moser et al. | |

FOREIGN PATENT DOCUMENTS

| | | |
|---|---|---|
| EP | 0 660 139 A1 | 6/1995 |
| EP | 2 302 292 A1 | 3/2011 |

OTHER PUBLICATIONS

French Preliminary Search Report dated May 4, 2017 in French Application 16 58254 filed on Sep. 6, 2016 (with English Translation of Categories of Cited Documents).

* cited by examiner

*Primary Examiner* — Evan P Dzierzynski
(74) *Attorney, Agent, or Firm* — Oblon, McClelland, Maier & Neustadt, L.L.P.

(57) ABSTRACT

The invention proposes a lighting module for motor vehicles, which comprises optical means for deviating in angular manner at least a portion of the light rays passing through them, without thereby changing the geometry of the projection lens of the lighting module.

16 Claims, 2 Drawing Sheets

LIGHTING MODULE WITH DIFFRACTION SCREEN FOR A MOTOR VEHICLE

BACKGROUND OF THE INVENTION

(1) Field of the Invention

The invention deals with the field of lighting projectors, especially for a motor vehicle. The invention concerns a lighting module having optical means able to deviate in a predetermined manner at least a portion of the light rays emanating from at least one light source of the module.

(2) Description of Related Art

A motor vehicle is equipped with projectors, or headlights, designed to illuminate the road in front of the vehicle, at night or during reduced luminosity. It is known how to use semiconductor type light sources such as light-emitting diodes or LED to create light beams. In particular, the same lighting module can be used to implement several lighting functions of a motor vehicle, such as the "low beam" or "high beam" functions, for example. In general, the light rays emanating from a light source, which may be composed of a plurality of elementary light sources such as LEDs, are oriented in a common predetermined direction by an optical system comprising projection lenses and/or reflector elements in order to provide a predetermined light impression. In order to realize certain regulatory lighting functions, however, it may become necessary to deviate at least a portion of the light rays of a beam in a direction other than this common direction. This is the case, for example, for the illumination of the overhead highway signs indicating directions for the drivers. It is known how to produce projection lenses having optical structures such as prisms or toroids molded in the glass making up the lens for a portion of their surface of incidence. The light rays impinging on this portion of surface of the lens are deviated in a predetermined manner, while the incident rays outside of this portion of surface are directed in the principal common direction, generally along the optical axis of the lens. The production of such lenses, however, is complicated and costly. What is more, the optical structures are visible on the lens from the outside of the vehicle, which is not desirable for certain applications.

BRIEF SUMMARY OF THE INVENTION

The objective of the invention is to mitigate at least one of the problems raised by the prior art. More precisely, the objective of the invention is to propose a device which is able to deviate in predetermined manner at least a portion of the light rays coming from a light source, without having recourse to the molding of specific lenses.

The subject matter of the invention is a lighting module for a motor vehicle, the module comprising a first light source to realize a first lighting function of the motor vehicle and a projection lens disposed downstream of the first light source. The module is distinguished in that the module comprises a screen provided with diffraction patterns, the screen being disposed between the focal plane of the lens and the projection lens, such that when the first light source emits light rays (110', 210', 310', 410') at least a portion of the light rays coming from the first light source pass through the screen.

The screen is preferably disposed perpendicular to the optical axis of the lens.

Preferably, the disposition of the screen may be such that a first portion of the light rays coming from the first light source pass through the screen, while a second portion of the light rays coming from the first light source impinge on the lens without passing through the screen.

The diffraction patterns may preferably include patterns which deviate in angular manner the light rays coming from the first light source and passing through the screen. Preferably, the light rays are deviated by a predetermined angle with respect to the optical axis of the lens, the angle being defined by the diffraction patterns of the screen.

Preferably, the diffraction patterns may include patterns which diffuse the light rays coming from the first light source passing through the screen.

The module may preferably comprise a second light source to realize a second lighting function of the motor vehicle, the disposition being such that when the second light source emits light rays, the light rays coming from the second light source likewise pass through the lens of the module.

At least a portion of the light rays coming from the second light source may preferably pass through the screen.

Preferably, the module may comprise a second screen, provided with diffraction patterns, the screen being disposed between the focal plane of the lens and the projection lens, such that at least a portion of the light rays coming from the second light source pass through the second screen.

The two screens may preferably be disposed at an equal distance from the lens and in the same plane.

Preferably, the portion of the screen or the screen through which pass the light rays coming from the first source and the portion of the screen or the screen through which pass the light rays coming from the second source may include different diffraction patterns.

The diffraction patterns of the first screen may preferably induce a blurring effect in a light beam passing through it. Preferably, the diffraction patterns of the second screen may deviate in angular manner a light beam passing through it.

Preferably, the beams realized respectively by the light rays coming from the first and the second source may be separated by a bending element which divides the beams according to a predetermined contour. The bending element may preferably comprise a shield. Preferably, the bending element may be a fixed or immobile bending element, whose position cannot be changed.

The first and the second screen may preferably be delimited by an edge which coincides with the predetermined contour created by the bending element which divides the beams coming from the first and the second light source respectively.

Preferably, the screen or screens may be disposed at a distance between 0.1 and 0.5 mm from the edge of the bending element which is oriented in the direction of the lens.

The diffraction patterns may preferably include holographic patterns. The diffraction patterns may preferably be holographic patterns.

The screens may preferably be realized in the form of pellicles or films of a plastic or synthetic material.

Preferably, at least one of the screens may be glued onto the surface of the lens facing the light source.

The screen may be preferably glued to one edge of said surface of the lens.

The light source or sources may preferably comprise semiconductor elements, especially light-emitting diodes (LED), organic light-emitting diodes (OLED), or laser diodes.

Preferably, one of the light sources may realize the "high beam" lighting function.

One of the light sources may preferably realize the "low beam" lighting function.

By utilizing the procedures according to the present invention, it becomes possible to deviate in a predetermined manner at least a portion of the light rays coming from a light source in a direction other than the principal direction, the principal direction corresponding generally to the optical axis of a projection lens through which all of the light rays emitted by the light source pass. By providing a thin screen comprising diffraction or holographic patterns, it is no longer necessary to shape specific lenses in order to accomplish the desired result. Since the screen may furthermore be glued onto a preexisting projection lens, the space required to install the proposed solution is much reduced. The proposed solution furthermore makes it possible to act in various ways on the beam of light rays passing through the screen in dependence on patterns realized on the surface of the screen. For example, the patterns may be such that the light rays passing through it are deviated in angular manner in a more vertical direction than the optical axis of the lens on which the screen is arranged. This makes it possible, for example, to illuminate the overhead highway signs while still using a "high beam" function of the vehicle, deviating only a portion of the light rays of the beam. The patterns may also be such that the edges of the light impression produced by the light beam passing through the screen are rendered more blurred. This makes it possible for example to hide the spaces created between the light impressions by fixed bending elements in light modules having several light sources. Combinations of different types of patterns may be useful in many other specific applications.

BRIEF DESCRIPTION OF THE SEVERAL VIEWS OF THE DRAWINGS

Other characteristics and advantages of the present invention will be better understood with the aid of the exemplary description and the drawings, of which:

FIG. 3b shows in schematic manner a lighting impression realized by the device of FIG. 3a;

FIG. 4b shows in schematic manner a lighting impression realized by the device of FIG. 4a;

FIG. 5b shows in schematic manner a lighting impression realized by the device of FIG. 5a;

FIG. 6 shows in schematic manner a front view of the screens with diffraction patterns of the device of FIG. 5a.

DETAILED DESCRIPTION OF THE INVENTION

In the following description, similar reference numbers will be used to describe similar concepts throughout the different embodiments of the invention. Thus, the numbers 100, 200, 300 and 400 describe a lighting module in four different embodiments according to the invention.

Unless otherwise indicated, technical characteristics described in detail for one given embodiment may be combined with the technical characteristics described in the context of other embodiments described in exemplary and nonlimiting manner.

Elements well known in the prior art with respect to the operation of a lighting module for motor vehicles, and not having any direct impact with regard to the present invention, will not be described in detail in the context of the present description for reasons of clarity of the presentation.

During the course of the description, the expression "light source" may designate in equivalent manner a single light source or a light source bringing together a plurality of elementary sources, such as one of the light-emitting diode or LED type.

The invention makes use of screens provided with diffraction patterns. Such a screen is realized on a pellicle or a thin film by a production device known in itself in the prior art and which will therefore not be described in further detail in the context of the present description. Known techniques, based on computer methods, make it possible to fabricate diffraction screens with an angular diffusion profile. The diffraction elements of a diffusion screen preferably comprise a holographic diffuser, especially one based on a three-dimensional hologram generated by a coherent light source of laser type. Such a holographic diffuser is described for example in the patent document U.S. Pat. No. 5,365,354.

The diffractive elements of such a screen are elements for processing of light rays. The dimensions of the diffractive elements have an order of magnitude close to a range of wavelengths of the light rays which impinge upon them. The diffractive elements preferably have an angular diffusion profile. In other words, the diffractive elements are configured to diffuse the light received toward a predetermined angular field.

Figure 1:
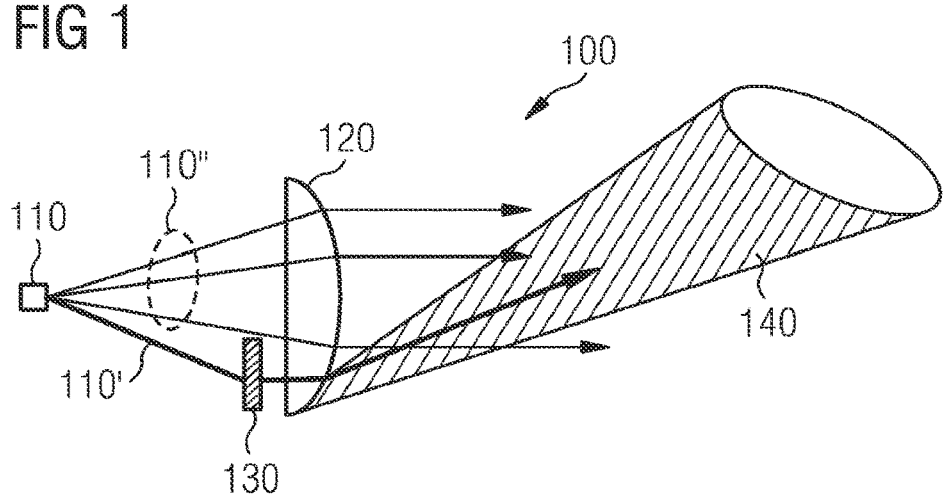
FIG. 1 shows in schematic manner a cross section through a device according to a preferred embodiment of the invention.

FIG. 1 gives an illustration of a lighting module 100 according to a first embodiment of the invention. The module comprises a light source 110, such as a light-emitting diode or LED. Downstream from the light source, along the direction of emission of the light rays, is situated a projection lens 120 whose function is to align the light rays in a common direction. The module 100 for example outfits a front light of a motor vehicle, and it may realize the high beam function. In order to ensure the illumination of the overhead highway signs when this function is executed, it is expedient to deviate at least a portion of the light beam vertically upward, as compared to the common direction given by the optical axis of the projection lens. Accordingly, the module 100 comprises a screen 130 provided with diffraction patterns, such as has been described above. It may in particular be a holographic diffuser. The dimensions of the screen are exaggerated in FIG. 1; in reality, it is a thin film of slight thickness. The screen 130 is disposed between the focal plane of the projection lens and the projection lens, such that at least a portion of the light rays 110' pass through the screen. The diffraction patterns of the screen 130 are chosen such that this portion of the light rays 110' is deviated in angular manner, vertically upward, to create the light cone 140 which is able to illuminate an overhead highway sign. Since it is sufficient to have a luminous flux of 10 lm in order to illuminate such an overhead sign, it is sufficient for a proportionately small portion of the light rays 110' to be deviated in the described manner. It is thus sufficient to provide a screen of reduced dimensions as compared to the surface of impingement of the projection lens. A second major portion 110" of the light rays coming from the light source 110 passes through the projection lens 120 without first passing through the screen 130, and thus without being subjected to the described angular deviation. It goes without saying that the different elements shown in FIG. 1 are maintained in their respective positions by support means not shown, such as arms or feet.

Figure 2:
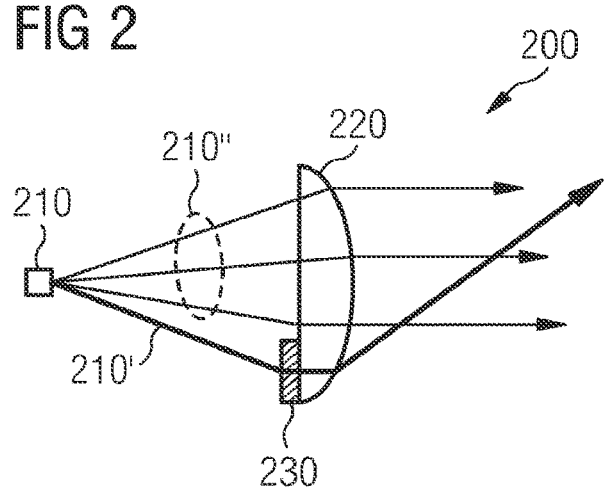
FIG. 2 shows in schematic manner a cross section through a device according to a preferred embodiment of the invention.

FIG. 2 shows an illustration of a lighting module 200 according to a second embodiment of the invention. The module comprises a light source 210. Downstream from the light source, in the direction of emission of the light rays, is situated a projection lens 220 whose function is to align the light rays in a common direction. The module 200 comprises a screen 230 provided with diffraction patterns, such as has been described above. It may in particular be a holographic diffuser. The dimensions of the screen are exaggerated in FIG. 2; in reality, it is a thin film of slight thickness. The screen 230 is glued to the surface of impingement of the projection lens 230, such that at least a portion of the light rays 210' pass through the screen. The diffraction patterns of the screen 230 are preferably chosen such that this portion of the light rays 210' is deviated in angular manner, vertically upward. For a plurality of conceivable applications, especially the illumination of overhead highway signs, it is sufficient to provide a screen of reduced dimensions as compared to the surface of impingement of the projection lens. The screen is preferably glued near an edge of the surface of the projection lens. A second major portion 210" of the light rays coming from the light source 210 passes through the projection lens 220 without first passing through the screen 230, and thus without being subjected to the described angular deviation.

Figure 3A:
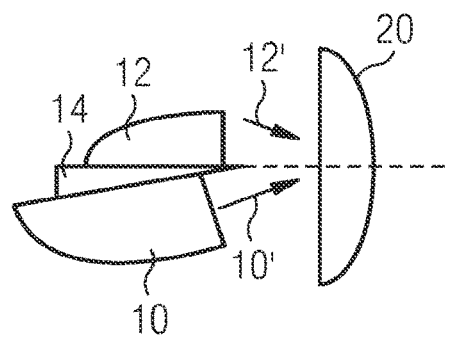
FIG. 3a shows in schematic manner a known device of the prior art utilizing two light sources, two reflectors, and a bending element to realize two different lighting functions whose lighting impressions are complementary.
Figure 3B:
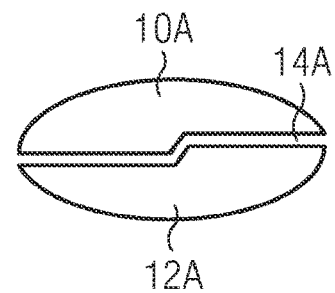

FIG. 3a shows a known device of the prior art, such as is described in detail for example in the patent document EP 2302292 A1. The device comprises two reflectors with generally semi-elliptical cross sections, which are configured so as to direct the light rays of a first and a second light source respectively toward a projection lens. The reference numbers 10 and 12 denote the two assemblages of light source and reflector, respectively. The first source 10 is designed to realize the high beam function of a vehicle, while the second light source 12 is designed to realize the low beam function. In high beam mode, the two light sources of the module are lit up and the light rays 10', 12' coming from the two sources pass through the projection lens 20. The light impression formed by the two sources has a generally elliptical shape. The impression is indicated in FIG. 3b and corresponds to the common contour of the zones 10A and 12A. Zone 10A corresponds to the impression realized when only the light source 10 is lit up. Zone 12A corresponds to the impression realized by the light source 12, which by itself realizes the low beam function. In order to separate the two impressions in a way conforming to the regulations, a bending element 14 or shield is interposed between the two light sources. The thickness of the bending element 14 creates the non-illuminated gap 14A which is visible in FIG. 3b. The shape of the gap is dictated by the particular geometry of the bending element 14 used. It is of note that the procedures according to the present invention make it possible to conceal this gap 14A without having recourse to movable bending elements or other mechanical elements which are complicated and sensitive, such as are known in the prior art.

Figure 4A:
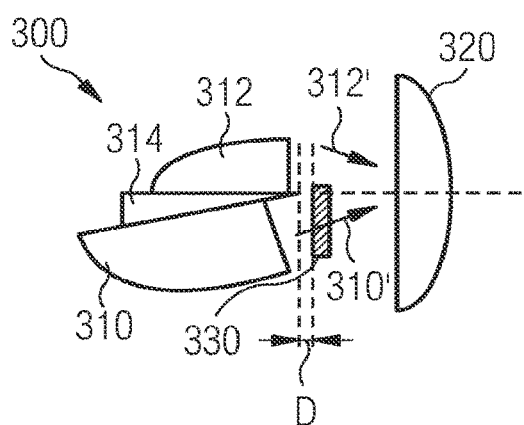
FIG. 4a shows in schematic manner a cross section through a device according to a preferred embodiment of the invention, utilizing two light sources, a screen with diffraction patterns, two reflectors and a bending element to realize two different lighting functions whose lighting impressions are complementary.
Figure 4B:
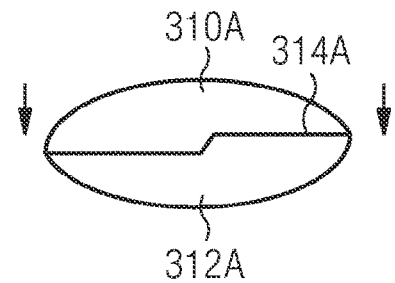

FIG. 4a shows a lighting module 300 according to a third embodiment of the invention. The module comprises a first light source 310 and a second light source 312. For example, these are light sources of light-emitting diode or LED type. The general configuration of FIG. 3a is followed, that is, the light sources are disposed inside generally semi-elliptical reflectors, designed to reflect the light rays in the direction of the projection lens 320. Other configurations of the two sources and/or reflectors are however conceivable without thereby leaving the scope of the present invention. As an example, the source 310 is designed to realize a high beam function, while the source 312 realizes a low beam function of the motor vehicle. In order to separate the two impressions in a way conforming to regulations, a bending element 314 or shield is interposed between the two light sources, in a way similar to the device of FIG. 3a. The module 300 comprises a screen 330 provided with diffraction patterns, such as was described above. In particular, it may be a holographic diffuser. The dimensions of the screen are exaggerated in FIG. 4a; in reality, it is a thin film of slight thickness. The screen 330 is disposed between the focal plane of the projection lens and the projection lens, such that at least a portion of the light rays 310' coming from the first light source, and preferably all of them, pass through the screen. The diffraction patterns of the screen 330 are chosen such that this portion of the light rays 310' is deviated in angular manner, vertically downward. The light rays 312' coming from the second light source impinge on the projection lens 320 without having first passed through the screen with diffraction patterns. The resulting light impression is shown in FIG. 4b. When compared with the impression of FIG. 3b, it becomes apparent that the gap between the zones 310A (created by the first source 310) and 312A (created by the second source 312) is no longer apparent when the two sources are lit up. In fact, the light beam 310' coming from the first source is deviated in angular manner downward, so as to cover the gap which is caused by the thickness of the bending element 314. It is thus possible to mask the visual representation of the bending element by using the screen 330 according to the invention. Preferably, the screen 330 is situated at a distance D on the order of 0.5 mm from the edge of the bending element 314. With an angular deviation of 6°, one can generally compensate for the thickness of the bending element. With a vertical angular deviation of 60° relative to the horizontal, one can realize a covering on the order of 1°.

Figure 5A:
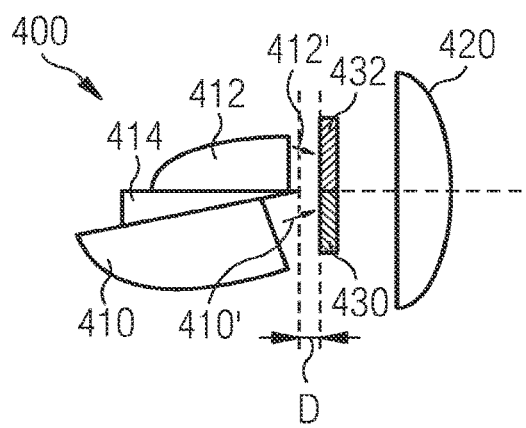
FIG. 5a shows in schematic manner a cross section through a device according to a preferred embodiment of the invention, utilizing two light sources, two screens with diffraction patterns, two reflectors and a bending element to realize two different lighting functions whose lighting impressions are complementary.

FIG. 5a shows a lighting module 400 according to a fourth embodiment of the invention. The module comprises a first light source 410 and a second light source 412. For example, these are light sources of light-emitting diode or LED type. The general configuration of FIG. 4a is followed, that is, the light sources are disposed inside generally semi-elliptical reflectors, designed to reflect the light rays in the direction of the projection lens 420. Other configurations of the two sources and/or reflectors are however conceivable without thereby leaving the scope of the present invention. As an example, the source 410 is designed to realize a high beam function, while the source 412 realizes a low beam function of the motor vehicle. According to current regulations in force, the high beam can be more blurred than the low beam. In order to separate the two impressions in a way conformable to regulations, a bending element 414 or shield is interposed between the two light sources, in a way similar to the device of FIG. 4*a*. The module 400 comprises a first 430 and a second 432 screen, the screens being provided with diffraction patterns, such as was described above. For example, these are holographic diffusers. The dimensions of the two screens are exaggerated in FIG. 5*a*; in reality they are thin films of slight thickness. The screen 430 is disposed between the focal plane of the projection lens and the projection lens, such that at least a portion of the light rays 410' coming from the first light source, and preferably all of them, pass through the screen. The diffraction patterns of the screen 430 are chosen such that this portion of the light rays 410' is diffused by passing through the screen 430. The screen 432 is disposed between the focal plane of the projection lens and the projection lens, such that at least a portion of the light rays 412' coming from the first light source, and preferably all of them, pass through the screen. The screens 432 and 430 are aligned in the same plane, perpendicular to the optical axis of the projection lens 420 or, in equivalent manner, parallel to the planar surface of incidence of the projection lens 420. The diffraction patterns of the screen 432 are chosen such that this portion of the light rays 420' is diffused in passing through the screen 432, but their diffusion is greater than that induced by the screen 430 in the light rays 410' coming from the first light source 410.

Figure 5B:
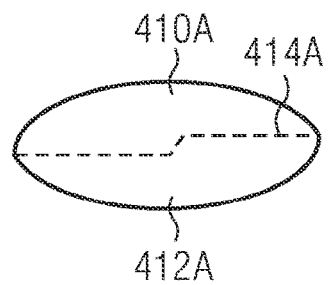
Figure 6:
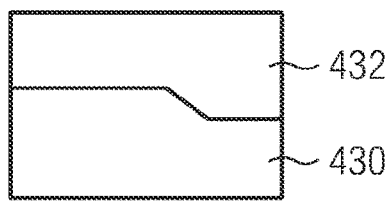

The resulting light impression is shown in FIG. 5*b*. When compared with the impression of FIG. 3*b*, it becomes apparent that the gap 414A between the zones 410A (created by the first source 410) and 412A (created by the second source 412) is no longer apparent when the two sources are lit up. In fact, the light beam 410' coming from the first source is blurred by diffusion, in order to attenuate the separation 414A between the two zones 410A and 412A. The light beam 412' coming from the second source 412 is likewise blurred by diffusion, but it is able to realize the clear cut-off desired when only the low beam function is used. It is thus possible to mask the visual representation of the bending element by using the screen 330 according to the invention. It goes without saying that in place of two distinct screens 430, 432 it is possible to provide a single screen having two distinct portions with different diffraction patterns, the two portions corresponding to the locations and to the properties of the screens 430 and 432 just described. Advantageously, the cut-off between the screens coincides with the cut-off realized by the edge of the bending element 414, which is shown in the front view of the screens 430 and 432 of FIG. 6. This arrangement makes it possible to ensure that the beams coming from the two sources 410 and 412 pass respectively through the screens 430 and 432.

The invention claimed is:

1. Lighting module for a motor vehicle, the module comprising:
    a first light source configured to produce a first lighting function of the motor vehicle, and
    a projection lens disposed downstream of the first light source,
    wherein the module comprises a screen provided with diffraction patterns, the screen being disposed between the focal plane of the lens and the projection lens, such that when the first light source emits light rays at least a first portion of the light rays coming from the first light source pass through the screen to produce a second lighting function deviated upwardly in a direction from a direction of the first lighting function, and a second portion of the light rays coming from the first light source do not pass through the screen to produce the first lighting function.

2. Lighting module according to claim 1, wherein the diffraction patterns include patterns which deviate in angular manner the light rays coming from the first light source and passing through the screen.

3. Lighting module according to claim 1, wherein the diffraction patterns include patterns which diffuse the light rays coming from the first light source passing through the screen.

4. Lighting module according to claim 1, wherein:
    the module comprises a second light source configured to produce a third lighting function of the motor vehicle, and
    when the second light source emits light rays, the light rays coming from the second light source likewise pass through the lens of the module.

5. Lighting module according to claim 4, wherein at least a portion of the light rays coming from the second light source pass through the screen.

6. Lighting module according to claim 4, wherein the module comprises a second screen, provided with diffraction patterns, the screen being disposed between the focal plane of the lens and the projection lens, such that at least a portion of the light rays coming from the second light source pass through the second screen.

7. Lighting module according to claim 6, wherein the first and the second screen are delimited by an edge which coincides with the predetermined contour created by the bending element which divides the beams coming from the first and the second light source respectively.

8. Lighting module according claim 4, wherein the beams produced respectively by the light rays coming from the first and the second source are separated by a bending element which divides the beams according to a predetermined contour.

9. Lighting module according to claim 8, wherein the screen or screens may be disposed at a distance between 0.1 and 0.5 mm from the edge of the bending element which is oriented in the direction of the lens.

10. Lighting module according to claim 4, wherein one of the light sources produces a "high beam" lighting function.

11. Lighting module according to claim 4, wherein one of the light sources produces a "low beam" lighting function.

12. Lighting module according to claim 1, wherein the portion of the screen or the screen through which pass the light rays coming from the first source and the portion of the screen or the screen through which pass the light rays coming from the second source include different diffraction patterns.

13. Lighting module according to claim 1, wherein the diffraction patterns are holographic patterns.

14. Lighting module according to claim 13, wherein the screen is glued to one edge of said surface of the lens.

15. Lighting module according to claim 1, wherein at least one of the screens is glued onto the surface of the lens facing the light source.

16. Lighting module according to claim 1, wherein the light source or sources comprise semiconductor elements, especially light-emitting diodes (LED).

* * * * *